United States Patent [19]

Doniat et al.

[11] 3,981,747
[45] Sept. 21, 1976

[54] PROCESS FOR PRODUCING ELECTRIC CURRENT BY THE ELECTROCHEMICAL OXIDATION OF AN ACTIVE ANODIC METAL, ESPECIALLY ZINC

[75] Inventors: Denis Doniat, Moillesulaz; Augusto Porta; Bernard Bugnet, both of Geneva, all of Switzerland

[73] Assignee: Societe Anonyme Automobiles Citroen, France

[22] Filed: Sept. 5, 1974

[21] Appl. No.: 503,283

Related U.S. Application Data

[63] Continuation of Ser. No. 275,182, July 26, 1972, abandoned.

[30] Foreign Application Priority Data

Aug., 1971 Switzerland.................. 11361/71

[52] U.S. Cl................................. 429/15; 429/17; 429/19; 429/29
[51] Int. Cl.².......................................... H01M 8/06
[58] Field of Search .............. 136/83, 86 A; 75/109

[56] References Cited
UNITED STATES PATENTS

| | | | |
|---|---|---|---|
| 1,963,893 | 6/1934 | Drouilly | 75/109 |
| 3,297,433 | 1/1967 | Stark | 75/109 |
| 3,505,113 | 4/1970 | Meiten et al. | 136/86 A |
| 3,513,031 | 5/1970 | Zaromb | 136/86 A |
| 3,592,693 | 7/1971 | Rosansky | 136/86 X |
| 3,592,698 | 7/1971 | Baba | 136/86 A |
| 3,741,749 | 6/1973 | Jochmann et al. | 75/109 |

*Primary Examiner*—John H. Mack
*Assistant Examiner*—H. A. Feeley
*Attorney, Agent, or Firm*—Robert E. Burns; Emmanuel J. Lobato; Bruce L. Adams

[57] ABSTRACT

A process for producing electric current by the electrochemical oxidation of an active anodic metal dispersed in an alkaline electrolyte.

The electrolyte is circulated into contact with a second metal which is more electronegative than the active metal. A displacement reaction precipitates the active metal from its soluble oxidation products. There is obtained as a result a repeated recovery for reuse of the active metal (zinc) with the aid of the more electronegative metal (aluminium) which then supplies the energy for the production of current and is oxidized to form soluble products.

The process is exemplified by zinc as the active metal and aluminium and magnesium as the strongly electronegative metals.

8 Claims, 1 Drawing Figure

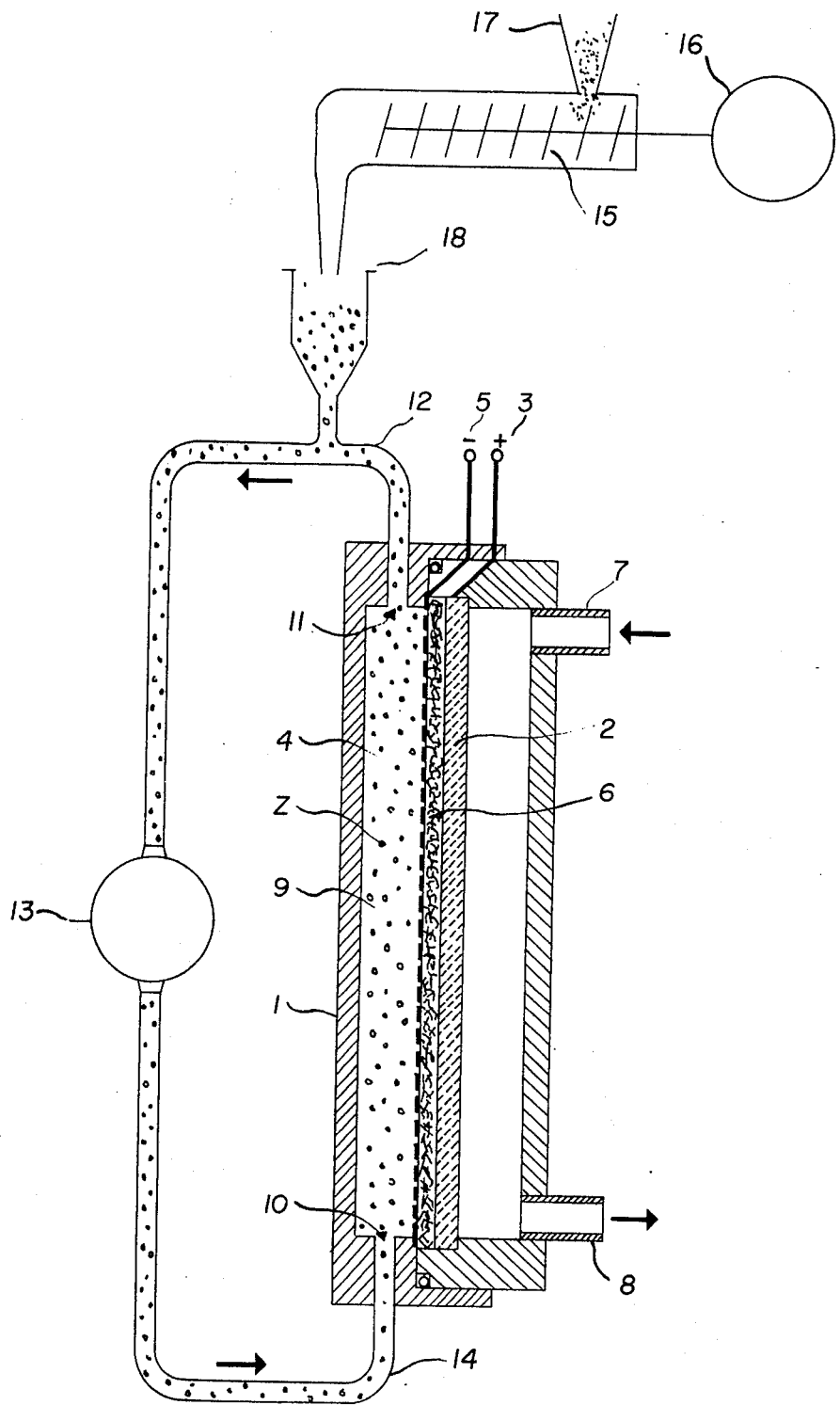

PROCESS FOR PRODUCING ELECTRIC CURRENT BY THE ELECTROCHEMICAL OXIDATION OF AN ACTIVE ANODIC METAL, ESPECIALLY ZINC

This is a continuation of application Ser. No. 275,182, filed July 26, 1972, now abandoned.

This invention relates to a process for producing electric current by the electrochemical oxidation of an active anodic metal, especially zinc.

Zinc has been used for a number of years as an active anodic material in electrochemical generators using an alkaline electrolyte. In addition to its low price, another considerable advantage of zinc is that, through electrochemical oxidation, it yields relatively large quantities of electrical energy. However, the product of this oxidation is soluble in the alkaline electrolyte and forms the zincate ion. Thus, the electrochemical oxidation reaction of zinc in an alkaline electrolyte takes place as follows:

$$Zn + 4\, OH^- \rightarrow Zn(OH)_4^{--} + 2e \qquad (1)$$

However, the rate at which the zincate ions $Zn(OH)_4^{--}$ are formed on the surface of the zinc during the discharge is generally much higher than the rate at which these ions can be distributed in the electrolyte. The result of this is the well-known phenomenon of passivation by a layer of oxide precipitated on the surface of the zinc.

In one known electrochemical generator, the active anodic mass used is in the form of zinc particles in suspension in the electrolyte which enables it to be replaced, this suspension being brought into contact with an anodic collector to induce the discharge. However, repeated replacement of the anodic suspension carried out between the successive discharge periods does not in itself enable passivation of the zinc to be avoided during the discharge.

In order to prevent passivation of the zinc, a current-generating process has been proposed in which an anodic suspension consisting of zinc particles suspended in an alkaline electrolyte is continuously recycled during discharge with a view to continuously bringing the particles in contact with an anodic collector, subsequently removing the suspension continuously from the collector along a path which enables products of this oxidation reaction to be dissolved and precipitated in the electrolyte, and bringing the suspension into contact with the anodic collector in order to subject these particles to a fresh oxidation. Accordingly, this process enables the zinc to be very effectively utilised by virtue of the aforementioned recycling by which it is possible to avoid passivation of the zinc and, hence, to supply high discharge currents over prolonged periods and to obtain substantially complete consumption of the zinc.

The use of other metals such as aluminium and magnesium instead of zinc would be of considerable interest so far as the electrochemical generation of current is concerned by virtue of the much greater mass capacity of these metals by comparison with that of zinc. However, the major obstacle to the use of aluminium is the extremely rapid corrosion which it undergoes when it is used as an active anodic mass in an alkaline electrolyte. Thus, in this case, the following corrosion reaction takes place:

$$Al + 3\, H_2O + OH^- \rightarrow Al(OH)_4^- + 3/2\, H_2 \qquad (2)$$

This spontaneous reaction renders the aluminium unusable as an active anodic material for inducing the discharge of current. In addition, it is accompanied by a vigorous, highly undesirable evolution of hydrogen.

In addition, the use of magnesium as an active anodic mass in alkaline medium involves difficulties attributable to the rapid passivation of the metal.

In view of these serious disadvantages of strongly electronegative metals such as aluminium, it has never been possible to use them as an active anodic material in electrochemical generators using an alkaline electrolyte. It is for this reason that zinc, which does not have any of these disadvantages, is currently being used as an active anodic material in spite of the considerable interest in more electronegative metals such as aluminium and magnesium.

The object of the present invention is to enable current to be electrochemically produced by means of a strongly electronegative metal such as aluminium or magnesium whilst obviating the aforementioned disadvantages of strongly electronegative metals.

The invention relates to a process for generating electrical current by the electrochemical oxidation of an active anodic metal, especially zinc, in a galvanic cell comprising an alkaline electrolyte and a solid oxygen or metal oxide cathode, in which the active anodic metal is used in the form of particles suspended in the electrolyte and brought into contact with an anodic-current collector, the product of oxidation being obtained in solution in the electrolyte. This process is distinguished by the fact that the electrolyte is brought into contact with a second metal more electronegative than the aforementioned active metal so as to precipitate the active metal from the oxidation product, the active metal thus precipitated is dispersed in the electrolyte and then brought into contact again with the anodic collector so as to produce the electrical current, these operations of electrochemical oxidation of the active metal, precipitation, dispersion and contacting being repeated so as to produce electrical current by repeated recovery and re-use of the aforementioned active metal with the aid of the aforementioned second metal whilst the second metal enters into solution in the electrolyte.

The invention also relates to an electrochemical generator for carrying out the process, comprising at least one galvanic cell with an alkaline electrolyte which in turn comprises a cathode and an anode compartment equipped with an anodic-current collector and containing an anodic suspension formed by particles of the active anodic metal in suspension in the electrolyte, this compartment communicating with the cathode through a partition which is permeable to the electrolyte and impermeable to the particles of active metal, distinguished by the fact that it comprises means enabling the anodic suspension to be brought into intimate contact with the second metal more electronegative than the active anodic metal.

In the practical application of the invention, the first active anodic metal intended for electrochemical oxidation can be zinc whilst the second metal serving to displace the zinc can be aluminium. In this case, the discharge of current is obtained in accordance with reaction (1) mentioned above, namely:

$$Zn + 4\, OH^- \rightarrow Zn(OH)_4^{--} + 2e \qquad (1)$$

At the same time, the displacement reaction takes place as follows:

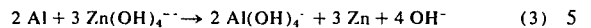

$$2\,Al + 3\,Zn(OH)_4^{--} \rightarrow 2\,Al(OH)_4^- + 3\,Zn + 4\,OH^- \quad (3)$$

The balance of these two reactions (1) and (3) thus gives:

$$2\,Al + 8\,OH^- \rightarrow 2\,Al(OH)_4^- + 6e \quad (4)$$

Thus it follows from this balance, that it is the aluminium which is irreversibly consumed during the production of current whilst the zinc is repeatedly recovered by displacement in accordance with reaction (3) which enables it to be repeatedly re-used in accordance with reaction (1).

In other words, it is in fact the aluminium which essentially provides the electrochemical energy required for generating electrical current by way of the zinc whose function is to produce the current through its electrochemical oxidation.

The accompanying drawing diagrammatically illustrates by way of example one embodiment of an electrochemical generator of electrical current for carrying out the process according to the invention. In this embodiment, zinc powder suspended in an alkaline electrolyte is used as the active anodic material.

The only FIGURE of the accompanying drawing is a diagrammatic view of this generator.

The generator comprises a galvanic cell 1 equipped with an air electrode 2 connected to a positive terminal 3, with an anodic-current collector 4 connected to a negative terminal 5 and with a porous separator 6 aranged between the electrode 2 and the collector 4.

The air electrode 2 forming the cathode of the generator is in the form of a flat porous plate. Its rear surface, opposite to the surface facing the separator 6 and the collector 4, is fed with air through a feed pipe 7 from an air source (not shown) such as a blower, nitrogen and excess air escaping through an outlet pipe 8. This cathode 2 can be in the form of a conventional air electrode consisting for example of a porous, sintered nickel plate covered with a layer of catalytic material based on active carbon and silver. The rear surface of this cathode, fed with air, provided with a porous hydrophobic layer, for example of polytetrafluoroethylene, allowing air through.

The active anodic mass consists of zinc particles Z in suspension in a liquid alkaline electrolyte such as 6N KOH.

In the present case, the average size of the zinc particles is of the order of 20 to 30 $\mu$, although it should be noted that this particle size is by no means critical.

The anodic collector 4 is in the form of a perforated partition made of a material that is a good conductor of electricity and chemically inert to the electrolyte. In the present case, it consists of a fine-mesh, for example 0.5 mm mesh, nickel gauze.

The separator 6, in contact with the anodic collector 4, can be of any conventional type, such as a sheet of felt of synthetic fibres, for example nylon fibres. It is selected for its ability to allow the electrolyte to pass through whilst preventing the zinc particles suspended therein from passing through.

The anodic collector 4 and the separator 6 thus define one side of a compartment 9 hereinafter referred to as the "anodic compartment", this compartment being intended for circulation of the anodic suspension between a lower inlet 10 and an upper outlet 11.

The compartment 9 forms part of a circuit around which the anodic suspension circulates. In addition to the compartment 9, this circuit comprises an upper conduit 12 connected to the outlet 11 and leading to the inlet of a pump 13, and a lower conduit 14 connected to the outlet end of this pump and opening into the compartment 9 at the inlet 10 thereof.

The circuit described above is used for continuously recycling anodic suspension so that the zinc particles in suspension come into contact with the collector 4 where they undergo electrochemical oxidation, giving rise to an electrical current, accompanied by the formation of zincate ions in accordance with reaction (1) described earlier on. The anodic suspension containing the zincate ions produced during the discharge is then continuously removed from the anodic compartment 9 and recycled by the pump 13 along the path formed by the conduits 12 and 14. The zincate ions thus leave the surface of the zinc particles by diffusion and are distributed in the electrolyte during recycling. Recycling of the suspension thus enables the suspended particles to be continuously brought into contact with the collector 4 to undergo fresh electrochemical oxidation. By virtue of this recycling, it is also possible to avoid passivation of the zinc by preventing the formation of an oxide layer on the surface of the particles.

In addition, the generator shown in the drawing comprises means for supplying the generator with aluminium powder. In this present embodiment, these means comprise a feed screw 15 driven at a variable speed by an electrical motor 16 and intended to transport a measured flow of aluminium powder from a hopper 17 and to discharge this powder into a hopper 18 connected to the upper conduit 12 of the aforementioned circulation circuit. These feed means thus enable a measured quantity of aluminium powder to be suspended in the anodic suspension circulating in the conduit 12. The motor 16 is fed by the generator through control means (not shown in the drawing) so that its rotational speed and, hence, the rotational speed of the screw 15 are governed by the intensity of the current produced by the generator.

The motor 16 can be a variable-speed direct-current motor of any suitable type. The rapid circulation of the anodic suspension containing the particles of zinc and aluminium as well as the zincate ions, enables the zinc to be displaced by the aluminium, the zincate ions thus being replaced by the aluminate ions in accordance with reaction (3) above.

The zinc thus displaced and suspended is thus returned by the electrolyte to the compartment 9 where it can undergo another oxidation during its contact with the collector 4 so as to produce current.

EXAMPLE

An anodic suspension consisting of 100 g. of 6N KOH and 15 g of zinc powder with a grain size of from 20 to 30 $\mu$, is introduced into a galvanic cell of the kind described above with a cross section of 33 cm$^2$ in the plane of the collector 4.

After the pump 13 has been put into operation and the electrode 2 fed with air, a discharge at 5 amps. and 1 volt is obtained for 1.5 hours.

12 g of aluminium powder are then added in several stages to the anodic suspension during a discharge of 5 hours' duration at approximately 5 amps. and 1 volt.

32.5 Ah are thus obtained over a total discharge period of 6 hours and 30 minutes at 5 amps. and 1 volt.

7.5 Ah are thus due to the zinc which corresponds to an effective mass capacity of approximately 500 Ah/kg of Zn, whilst 25 Ah are due to the aluminium which corresponds to a mass capacity of 2080 Ah/kg of Al.

The mean specific energy of the anodic suspension is thus 255 Wh/kg.

It should be noted that it is not possible by using zinc alone to obtain a discharge such as this with a mean specific energy of 255 Wh/kg. In fact, if zinc were to be used on its own to obtain a similar discharge inducing 32.5 Ah under 1 volt, it would be necessary to use 65 g of zinc and 400 g of 6N KOH in view of the solubility of the zincate ions in this electrolyte. This would correspond to a specific energy of approximately 70 Wh/kg of anodic suspension. Thus, by adding aluminium to the anodic suspension, the specific energy is considerably increased from 70 to 255 Wh/kg, i.e. in a ratio of approximately 3.6.

It should be noted that the generator described and the figures quoted above have only been given by way of indication. It is obvious that the generator described above can comprise for example any number of cells 1 connected to collectors and to a common circulation circuit so as to form a battery having the capacity and voltage required for a given application.

In addition, it is pointed out that it is possible to use either chemical or other separation means to eliminate the aluminate ions from the anodic suspension in order to prevent the electrolyte from becoming saturated with these ions. Elimination of the aluminate ions in this way affords considerable advantages, in particular an appreciable increase in the specific energy.

As can be seen from the foregoing, the present invention affords considerable advantages due in particular to the use of a strongly electronegative metal of high mass capacity, such as aluminium, in combination with a less electronegative metal, such as zinc, with a lower mass capacity.

In addition, it is pointed out that the generator for carrying out the process according to the invention can have forms other than that described. Similarly, the manner in which the displacement reaction carried out and the means used for this purpose can be different from those described above.

For example, it is not absolutely essential to use the aluminium in powder form. In fact, the zinc can be displaced by bringing the anodic suspension into continuous or periodic contact with solid aluminium in the form of plates or bands for example, whilst the zinc precipitated on the surface of the aluminium can be removed and suspended under the effect of the agitation of the suspension and, if necessary, with the aid of suitable scraping means.

Although the Zn—Al anodic system described has the considerable advantages referred to above, other systems can also be envisaged. For example, the aluminium can be replaced by magnesium.

Similarly, the KOH has been mentioned by way of example and it is obvious that any other suitable liquid alkaline electrolyte, such as NaOH for example, can be used.

We claim:

1. In an energy conversion process providing electrical discharge by electrochemical oxidation of a particulate anode-active metal in at least one electrochemical cell containing an electrolyte solution capable of dissolving the products of said oxidation, the improvements consisting of:
   a. removing from said cell electrolyte solution containing dissolved products of said oxidation resulting from discharge and adding to said solution a high mass-capacity metal which is dissolved therein so as to thereby chemically displace and precipitate said anode-active metal by reducing the said electrochemical oxidation products dissolved in the electrolye solution, so as to thereby recover said anode-active metal in the form of particles in suspension in the electrolyte solution;
   b. recycling the recovered anode-active metal particles in suspension in said electrolyte solution whereby to provide discharge with renewed oxidation of said recovered metal in said cell: and
   c. repeating said steps (a) and (b) so as to provide electrical discharge in said cell due to repeated recovery and renewed oxidation of said anode-active metal, with consumption of said high mass-capacity metal which is added to the electrolyte solution and dissolved therein outside said cell.

2. An energy conversion process according to claim 1 wherein said anode-active metal is zinc in suspension in an alkaline electrolyte solution and said high mass-capacity metal is selected from the group consisting of aluminium and magnesium.

3. An energy conversion process according to claim 2 wherein particulate aluminium is added to and dissolved in the alkaline electrolyte solution which is removed from the electrochemical cell and contains dissolved zinc oxidation products.

4. In an energy conversion process providing electrical discharge by electro-chemical oxidation of particulate zinc in at least one electrochemical cell containing an alkaline electrolyte solution capable of dissolving the products of said zinc oxidation, the improvements consisting of:
   a. removing from said cell alkaline electrolyte solution containing dissolved products of zinc oxidation resulting from discharge, and further containing particulate zinc in suspension in said electrolyte solution, and adding thereto aluminium which is dissolved in said electrolyte solution so as to thereby chemically displace and precipitate zinc particles by reducing said dissolved zinc oxidation products, whereby to recover particulate zinc in suspension in said solution;
   b. recycling the suspension containing said recovered particulate zinc so as to provide discharge with renewed oxidation of said recovered zinc in said cell; and
   c. repeating said steps (a) and (b) so as to provide electrical discharge in said cell due to repeated recovery and renewed oxidation of said particulate zinc, with consumption of the aluminium which is added to the electrolyte solution and is dissolved therein outside said cell.

5. An energy conversion process according to claim 4 wherein a suspension of zinc particles in the alkaline electrolyte is caused to circulate along a closed-loop path passing on one hand through said cell, to provide discharge by oxidation of the zinc particles in suspension, and on the other hand along an external portion of said path for removing from said cell said suspension containing dissolved products of zinc oxidation resulting from discharge, for adding aluminium to the suspension removed from said cell, whereby to recover particulate zinc in suspension, and for recycling said suspension to said cell so as to provide discharge therein due to repeated recovery and renewed oxidation of said particulate zinc.

6. An energy conversion process according to claim 5 wherein particulate aluminium is added in a controlled amount so as to allow the repeated recovery of the zinc.

7. In a power generator providing electrical discharge by electrochemical oxidation of a particulate anode-active metal, comprising at least one electrochemical cell containing an electrolyte capable of dissolving the products of said oxidation, anodic current collector means communicating with cathode means via electrolyte-permeable partition means defining an anodic compartment, and further comprising means for recirculating the electrolyte through said cell, the improvements consisting of:

a. said recirculating means being arranged to define a closed-loop path wherein a suspension of said anode-active metal in the electrolyte is caused to circulate on one hand along an internal portion of said path, passing through said anodic compartment within said cell, to provide oxidation of said anode-active particulate metal by contacting said anodic current collector during discharge, and on the other hand along an external portion of said closed-loop path, whereby to remove from said cell the said suspension containing products of said oxidation, to provide said oxidation products dissolved in the electrolyte of said suspension, and to recycle said suspension to the cell via said external portion of said closed-loop path: and b. feed means associated with said external portion of the closed-loop path and arranged to add to the electrolyte of the suspension removed from said cell a controlled amount of a high-mass-capacity metal capable of displacing said anode-active metal from the said dissolved oxidation products, whereby the anode-active metal is precipitated and thereby recovered in the form of particles in suspension in the electrolyte, and is recycled to the cell for renewed oxidation therein.

8. A power generator according to claim 7, wherein said recirculating means are arranged to circulate a suspension of zinc in an alkaline electrolyte along said closed-loop path during discharge, and wherein said feed means are arranged to add a controlled amount of particulate aluminium.

* * * * *